US012428608B2

(12) United States Patent
Sivik et al.

(10) Patent No.: US 12,428,608 B2
(45) **Date of Patent: *Sep. 30, 2025**

(54) CLEANING COMPOSITION

(71) Applicant: The Procter & Gamble Company, Cincinnati, OH (US)

(72) Inventors: Mark Robert Sivik, Mason, OH (US); Kristine Lynn Fliter, Harrison, OH (US); Robert Edward Shumate, Hamilton, OH (US); Stephen Anthony Derose, Reading, OH (US); Gang Si, Newcastle upon Tyne (GB); Michael McDonnell, Blyth (GB); Sophia Rose Ebert, Mannheim (DE); Bjoern Ludolph, Ludwigshafen (DE)

(73) Assignee: The Procter & Gamble Company, Cincinnati, OH (US)

( * ) Notice: Subject to any disclaimer, the term of this patent is extended or adjusted under 35 U.S.C. 154(b) by 421 days.

This patent is subject to a terminal disclaimer.

(21) Appl. No.: 17/869,249

(22) Filed: Jul. 20, 2022

(65) Prior Publication Data

US 2022/0364021 A1 Nov. 17, 2022

Related U.S. Application Data

(63) Continuation of application No. PCT/US2021/014264, filed on Jan. 21, 2021.

(60) Provisional application No. 62/967,080, filed on Jan. 29, 2020.

(51) Int. Cl.

| | |
|---|---|
| ***C11D 1/22*** | (2006.01) |
| ***C11D 1/29*** | (2006.01) |
| ***C11D 1/72*** | (2006.01) |
| ***C11D 1/83*** | (2006.01) |
| ***C11D 3/28*** | (2006.01) |
| ***C11D 3/30*** | (2006.01) |
| ***C11D 3/37*** | (2006.01) |
| *C11D 1/722* | (2006.01) |

(52) U.S. Cl.

CPC .................. *C11D 1/83* (2013.01); *C11D 1/22* (2013.01); *C11D 1/29* (2013.01); *C11D 1/721* (2013.01); *C11D 1/722* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,857,213 | A | 8/1989 | Caswell | |
| 6,380,143 | B1 | 4/2002 | Kvietok | |
| 6,521,577 | B1 | 2/2003 | Ofosu-Asante | |
| 6,525,013 | B1 | 2/2003 | Littig et al. | |
| 6,562,776 | B1 | 5/2003 | Smith et al. | |
| 6,887,838 | B2 | 5/2005 | Dykstra et al. | |
| 7,326,675 | B2 | 2/2008 | Schneiderman et al. | |
| 8,097,579 | B2 | 1/2012 | Danziger | |
| 2006/0135395 | A1 | 6/2006 | Schneiderman et al. | |
| 2006/0135396 | A1 | 6/2006 | Schneiderman | |
| 2006/0234898 | A1 | 10/2006 | Schneiderman | |
| 2009/0124531 | A1 | 5/2009 | Danziger | |
| 2011/0237486 | A1 | 9/2011 | Souter et al. | |
| 2015/0057211 | A1* | 2/2015 | Hulskotter | C11D 1/00 510/276 |
| 2015/0057213 | A1* | 2/2015 | Hulskotter | C11D 3/30 510/499 |
| 2015/0315523 | A1 | 11/2015 | Hulskotter | |
| 2015/0322387 | A1 | 11/2015 | Ohtani et al. | |
| 2017/0015948 | A1* | 1/2017 | Johnson | C11D 3/001 |
| 2018/0195029 | A1 | 7/2018 | Delaney | |
| 2018/0216029 | A1 | 8/2018 | Wildemuth et al. | |
| 2018/0216037 | A1* | 8/2018 | Hamersky | C11D 1/8305 |
| 2019/0010425 | A1 | 1/2019 | Scialla et al. | |
| 2022/0154108 | A1* | 5/2022 | Ludolph | C08G 73/024 |
| 2022/0356416 | A1 | 11/2022 | Sivik et al. | |

FOREIGN PATENT DOCUMENTS

| | | | |
|---|---|---|---|
| CN | 108330012 | A | 7/2018 |
| JP | 2001226696 | A | 8/2001 |
| RU | 2307867 | C2 | 10/2007 |
| RU | 2499037 | C2 | 11/2013 |
| WO | 2017060493 | A1 | 4/2017 |
| WO | 2019007754 | A1 | 1/2019 |

OTHER PUBLICATIONS

All Office Actions; U.S. Appl. No. 17/869,299, filed Jul. 20, 2022.

PCT Search Report and Written Opinion for PCT/US2021/014264 dated Jun. 18, 2021, 20 pages.

* cited by examiner

*Primary Examiner* — Lorna M Douyon

(74) *Attorney, Agent, or Firm* — Andrew J. Mueller

(57) ABSTRACT

A detergent composition can include a cleaning composition including: (a) linear alkyl benzene sulphonate surfactant; (b) alkyl ethoxylated sulphate surfactant; and (c) alkoxylated polymer.

5 Claims, No Drawings

CLEANING COMPOSITION

FIELD OF THE INVENTION

A cleaning composition comprises a specific surfactant system and a specific polymer. The cleaning composition exhibits improved grease cleaning performance and improved sebum cleaning performance.

BACKGROUND OF THE INVENTION

The present application addresses the problem of poor grease cleaning performance and poor sebum cleaning performance of cleaning compositions such as laundry detergent compositions, dish-washing compositions and hard surface cleaning compositions. Good grease cleaning performance and good sebum cleaning performance can be attained by combining a specific surfactant system and a specific polymer.

SUMMARY OF THE INVENTION

Included herein is a cleaning composition comprising:

(a) linear alkyl benzene sulphonate surfactant;

(b) alkyl ethoxylated sulphate surfactant;

(c) alkoxylated polymer comprising a core structure selected from:

(i). linear oligoamine represented by structure below

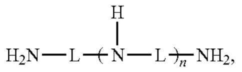

wherein each L is independently —($C_mH_{2m}$)—, wherein the index m is an integer from 2 to 6, and wherein the index n is an integer of from 0 to 10;

(ii) sugar alcohol comprising at least 4 hydroxy moieties; and (iii) cyclic amine represented by structure below:

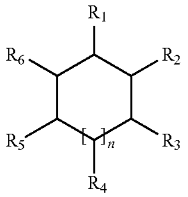

wherein $R_1$-$R_6$ are independently selected from H, —$NH_2$, —($C_1$-$C_4$)—$NH_2$, linear or branched alkyl or alkenyl having from 1 to 10 carbon atoms, wherein at least two of $R_1$-$R_6$ are selected from —$NH_2$ and —($C_1$-$C_4$)$NH_2$ or combination, and wherein the index n is an integer of from 0 to 3;

wherein at least one of the active H in —OH, —NH— and/or —$NH_2$ moieties of the polymer core is modified with an alkylene oxide moiety selected from ethylene oxide (EO), propylene oxide (PO), butylene oxide (BO) and mixtures thereof, wherein EO/PO/BO alkylene oxide moiety substituents are arranged randomly or in block configuration, and wherein the average number of EO (x), average number of PO (y), and average number of BO (z) per active H in —OH, —NH— and/or —$NH_2$ moieties of the polymer core structure are determined by the following:

(a) when the polymer core structure is linear oligoamine according to formula (i), then y+z is more than 2, and the ratio of (y+z)/x is from 51:49 to 100:0;

(b) when the polymer core structure is a sugar alcohol according to formula (ii), then y is from 6 to 50, and the ratio of (y+z)/x is from 51:49 to 100:0, and (c) when the polymer core structure is a cyclic amine according to formula (iii), then y is from 1 to 50, and x and z are from 0 to 50.

DETAILED DESCRIPTION OF THE INVENTION

Features and benefits of the various embodiments of the present invention will become apparent from the following description, which includes examples of specific embodiments intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, the articles including "the," "a" and "an" when used in a claim or in the specification, are understood to mean one or more of what is claimed or described.

As used herein, the terms "include," "includes" and "including" are meant to be non-limiting.

The term "substantially free of" as used herein refers to either the complete absence of an ingredient or a minimal amount thereof merely as impurity or unintended byproduct of another ingredient. In some aspects, a composition that is "substantially free" of a component means that the composition comprises less than 0.1%, or less than 0.01%, or even 0%, by weight of the composition, of the component.

As used herein, the term "soiled material" is used non-specifically and may refer to any type of flexible material consisting of a network of natural or artificial fibers, including natural, artificial, and synthetic fibers, such as, but not limited to, cotton, linen, wool, polyester, nylon, silk, acrylic, and the like, as well as various blends and combinations. Soiled material may further refer to any type of hard surface, including natural, artificial, or synthetic surfaces, such as, but not limited to, tile, granite, grout, glass, composite, vinyl, hardwood, metal, cooking surfaces, plastic, and the like, as well as blends and combinations.

In this description, all concentrations and ratios are on a weight basis of the cleaning composition unless otherwise specified.

Cleaning composition: The cleaning composition comprises:

(a) linear alkyl benzene sulphonate surfactant;

(b) alkyl ethoxylated sulphate surfactant;

(c) alkoxylated polymer comprising a core structure selected from:

(i). linear oligoamine represented by structure below

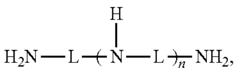

wherein each L is independently —($C_mH_{2m}$)—, wherein the index m is an integer from 2 to 6, and wherein the index n is an integer of from 0 to 10;

(ii) sugar alcohol comprising at least 4 hydroxy moieties; and (iii) cyclic amine represented by structure below:

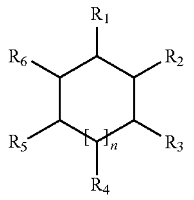

wherein $R_1$-$R_6$ are independently selected from H, —$NH_2$, —$(C_1$-$C_4)NH_2$, linear or branched alkyl or alkenyl having from 1 to 10 carbon atoms, wherein at least two of $R_1$-$R_6$ are selected from —$NH_2$ and —$(C_1$-$C_4)NH_2$ or combination, and wherein the index n is an integer of from 0 to 3;

wherein at least one of the active H in —OH, —NH— and/or —$NH_2$ moieties of the polymer core is modified with an alkylene oxide moiety selected from ethylene oxide (EO), propylene oxide (PO), butylene oxide (BO) and mixtures thereof wherein EO/PO/BO alkylene oxide moiety substituents are arranged randomly or in block configuration, and wherein the average number of EO (x), average number of PO (y), and average number of BO (z) per active H in —OH, —NH— and/or —$NH_2$ moieties of the polymer core structure are determined by the following:

(a) when the polymer core structure is linear oligoamine according to formula (i), then y+z is more than 2, and the ratio of (y+z)/x is from 51:49 to 100:0;

(b) when the polymer core structure is a sugar alcohol according to formula (ii), then y is from 6 to 50, and the ratio of (y+z)/x is from 51:49 to 100:0; and (c) when the polymer core structure is a cyclic amine according to formula (iii), then y is from 1 to 50, and x and z are from 0 to 50.

As used herein the phrase "cleaning composition" or "detergent composition" includes compositions and formulations designed for cleaning soiled material. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The cleaning compositions may have a form selected from liquid, powder, single-phase or multi-phase unit dose, pouch, tablet, gel, paste, bar, or flake.

Preferably, the weight ratio of linear alkyl benzene sulphonate surfactant to alkyl ethoxylated sulphate surfactant is greater than 2.0:1.

The composition can used for removing grease and/or body soils from a surface.

The composition can be a laundry detergent composition, dish-washing detergent composition, or hard surface cleaning composition.

Alkyl ethoxylated sulphate surfactant: A suitable alkyl ethoxylated sulphate surfactant has an average degree of ethoxylation of from 0.1 to 5.

Alkoxylated polymer: The alkoxylated polymer comprises a core structure selected from:

(i). linear oligoamine represented by structure below

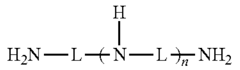

wherein each L is independently —$(C_mH_{2m})$—, wherein the index m is an integer from 2 to 6, and wherein the index n is an integer of from 0 to 10;

(ii) sugar alcohol comprising at least 4 hydroxy moieties; and (iii) cyclic amine represented by structure below:

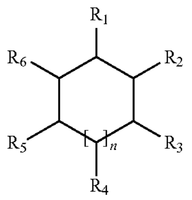

wherein $R_1$-$R_6$ are independently selected from H, —$NH_2$, —$(C_1$-$C_4)NH_2$, linear or branched alkyl or alkenyl having from 1 to 10 carbon atoms, wherein at least two of $R_1$-$R_6$ are selected from —$NH_2$ and —$(C_1$-$C_4)NH_2$ or combination, and wherein the index n is an integer of from 0 to 3;

wherein at least one of the active H in —OH, —NH— and/or —$NH_2$ moieties of the polymer core is modified with an alkylene oxide moiety selected from ethylene oxide (EO), propylene oxide (PO), butylene oxide (BO) and mixtures thereof, wherein EO/PO/BO alkylene oxide moiety substituents are arranged randomly or in block configuration, and wherein the average number of EO (x), average number of PO (y), and average number of BO (z) per active H in —OH, —NH— and/or —$NH_2$ moieties of the polymer core structure are determined by the following:

(a) when the polymer core structure is linear oligoamine according to formula (i), then y+z is more than 2, and the ratio of (y+z)/x is from 51:49 to 100:0;

(b) when the polymer core structure is a sugar alcohol according to formula (ii), then y is from 6 to 50, and the ratio of (y+z)/x is from 51:49 to 100:0; and (c) when the polymer core structure is a cyclic amine according to formula (iii), then y is from 1 to 50, and x and z are from 0 to 50.

It may be preferred that the average number of EO (x), average number of PO (y), and average number of BO (z) per active H in —OH, —NH— and/or —$NH_2$ moieties of the polymer core structure are determined by the following:

(a) when the polymer core structure is linear oligoamine according to formula (i), then y+z is more than 2, and the ratio of (y+z)/x is from 60:40 to 100:0. Preferably, the ratio of (y+z)/x is from 70:30 to 100:0, from 80:20 to 100:0, or from 90:10 to 100:0. And (b) when the polymer core structure is a sugar alcohol according to formula (ii), then y is from 6 to 50, and the ratio of (y+z)/x is from 60:40 to 100:0. Preferably, the ratio of (y+z)/x is from 70:30 to 100:0, from 80:20 to 100:0, or from 90:10 to 100:0. And (c) when the polymer core structure is a cyclic amine according to formula (iii), then y is from 1 to 50, and x and z are from 0 to 50. Preferably, y is from 3 to 50. Preferably, (y+z)>x.

It may be preferred that the alkoxylated polymer comprises a core structure selected from sugar alcohol comprising at least 4 hydroxy moieties, wherein at least one of the hydroxy moieties is modified with an alkylene oxide moiety selected from ethylene oxide (EO), propylene oxide (PO), butylene oxide (BO) and mixtures thereof, and wherein at least one of the hydroxy moieties derived from the alkylene oxide moiety is further substituted with an amino functional group.

Typically, the average number of EO (x), average number of PO (y), and average number of BO (z) per active H in —OH, —NH— and/or $—NH_2$ moieties of the polymer is calculated based on the total mole of EO/PO/BO in the polymer molecule, and the total number of active H in —OH, —NH— and/or $—NH_2$ moieties of the core structure:

x=total mole of EO in polymer molecule/total number of active H y=total mole of PO in polymer molecule/total number of active H z=total mole of BO in polymer molecule/total number of active H Polymer may be represented as:

$Core/(EO/OH)_x/(PO/OH)_y/(BO/OH)_z$, when the core is sugar alcohol; or $Core/(EO/NH)_x/(PO/NH)_y/(BO/NH)_z$, when the core is linear oligoamine or cyclic amine.

Linear oligoamine: The linear oligoamine is represented by structure below:

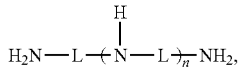

wherein each L is independently $—(C_mH_{2m})—$, wherein the index m is an integer from 2 to 6; and wherein the index n is an integer of from 0 to 10. When the polymer core structure is linear oligoamine as defined above, then y+z is more than 2, and the ratio of (y+z)/x is from 51:49 to 100:0.

Suitable linear oligoamine according to the present disclosure may include ethylenediamine (EDA); 1,2- or 1,3-propylenediamine (PDA); butylenediamine (BDA); pentamethylenediamine (PMDA); hexamethylenediamine (HMDA); diethylenetriamine (DETA); dipropylenetriamine (DPTA); triethylenetetraamine (TETA); tripropylenetetraamine (TPTA); tetraethylenepentaamine (TEPA); tetrapropylenepentaamine (TPPA); pentaethylenehexaamine (PEHA); pentapropylenehexaamine (PPHA); hexaethyleneheptaamine (HEHA); hexapropyleneheptaamine (HPHA); N,N'-Bis(3-aminopropyl)ethylenediamine; and any mixture thereof.

The active H in —NH— and $—NH_2$ moiety of linear oligoamine: when the linear oligoamine is modified, from at least 1 to all active H in —NH— and $—NH_2$ moieties of the linear oligoamine can be potentially substituted. For each —NH— moiety, there is one active H; for each $—NH_2$ moiety, there are two active H.

Using ethylenediamine (EDA) as an example, there are 4 active H in total in the molecule. When ethylenediamine (EDA) is modified, from at least 1 to at most 4 active H can be substituted.

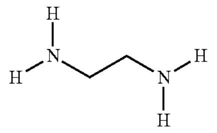

Using tetraethylenepentaamine (TEPA) as an example, there are 7 active H in total in the molecule. When tetraethylenepentaamine (TEPA) is modified, from at least 1 to at most 7 active H can be substituted.

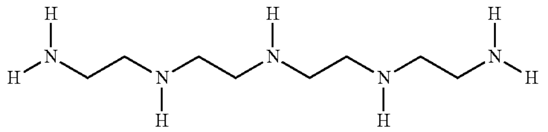 [SMILES: NCCNCCNCCNCCN]

Typically, when the polymer core structure is linear oligoamine according to formula (i), then y+z is more than 2, and the ratio of (y+z)/x is from 51:49 to 100:0;

Sugar alcohol: Typically, the sugar alcohol comprises at least 4 hydroxy moieties. Typically, when the polymer core structure is a sugar alcohol as defined above, then y is from 6 to 50, and the ratio of (y+z)/x is from 51:49 to 100.

Suitable sugar alcohol according to the present disclosure may include.

Sugar alcohol (also called polyhydric alcohols, polyalcohols, alditols or glycitols) are polyols compounds derived from sugars. Suitable sugar alcohols for use herein include erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), iditol (6-carbon), volemitol (7-carbon), isomalt (12-carbon), maltitol (12-carbon), lactitol (12-carbon), maltotriitol (18-carbon), maltotetraitol (24-carbon).

Preferably, the sugar alcohol is derived from monosaccharides with 4-6 carbon atoms: erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), iditol (6-carbon). Most preferably the sugar alcohol is sorbitol.

The active H in —OH moiety of sugar alcohol: when the sugar alcohol is modified, from at least 1 to all active H in —OH moieties of the sugar alcohol can be potentially substituted. For each —OH moiety, there is one active H.

Using sorbitol as an example, there are 6 active H in total in the molecule. When sorbitol is modified, from at least 1 to at most 6 active H can be substituted.

When the polymer core structure is a sugar alcohol as defined above, then y is from 6 to 50, and the ratio of (y+z)/x is from 51:49 to 100:0; and Cyclic amine: The cyclic amine is represented by structure below:

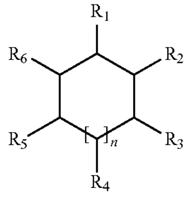

wherein $R_1$-$R_6$ are independently selected from H, —$NH_2$, —($C_1$-$C_4$)$NH_2$, linear or branched alkyl or alkenyl having from 1 to 10 carbon atoms, wherein at least two of $R_1$-$R_6$ are selected from —$NH_2$ and —($C_1$-$C_4$)$NH_2$ or combination, and wherein the index n is an integer of from 0 to 3.

Typically, wherein the —($C_1$-$C_4$)$NH_2$ represent a group independently selected from —$CH_2NH_2$,
—$CH_2CH_2NH_2$,
—$CH_2CH_2CH_2NH_2$, —$CH(CH_3)CH_2NH_2$, —$CH_2CH(CH_3)NH_2$,
—$CH_2CH_2CH_2CH_2NH_2$,
—$CH(CH_3)CH_2CH_2NH_2$, —$CH_2CH(CH_3)CH_2NH_2$, —$CH_2CH_2CH(CH_3)NH_2$,
—$CH(CH_3)CH(CH_3)NH_2$, —$C(CH_3)_2CH_2NH_2$, —$CH_2C(CH_3)_2NH_2$, as well as all other possible isomers.

Preferably, the —($C_1$-$C_4$)$NH_2$ represent a group independently selected from —$CH_2NH_2$ and —$CH_2CH_2NH_2$.

Suitable cyclic amine according to the present disclosure may include 1,3-bis(methylamine)-cyclohexane, 2-methylcyclohexane-1,4-diamine, 4-methylcyclohexane-1,4-diamine, cyclohexane-1,2-diamine, cyclohexane-1,3-diamine, cyclohexane-1,4-diamine. Typically, the cyclic amine can cover all possible stereoisomers.

Preferably, suitable cyclic oligoamine according to the present disclosure may be represented by structure below:

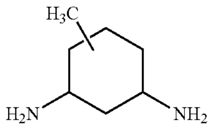

Typically, the active H in —$NH_2$ moiety of cyclic amine: when the cyclic amine is modified, from at least 1 to all active H in —$NH_2$ moieties of the cyclic amine can be potentially substituted. For each —$NH_2$ moiety, there are two active H.

Using cyclohexane-1,2-diamine as an example, there are 4 active H in total in the molecule. When cyclohexane-1,2-diamine is modified, from at least 1 to at most 4 active H can be substituted.

Typically, when the polymer core structure is a cyclic amine as defined above, then y is from 1 to 50, and x and z are from 0 to 50.

Laundry detergent composition: Suitable laundry detergent compositions include laundry detergent powder compositions, laundry detergent liquid compositions, laundry detergent gel compositions, and water-soluble laundry detergent compositions.

Dish-washing detergent composition: Suitable dish-washing detergent compositions include hand dish-washing detergent compositions and automatic dish-washing detergent compositions.

Surfactant System: The cleaning compositions comprise a surfactant system in an amount sufficient to provide desired cleaning properties. The cleaning composition may comprise, by weight of the composition, from about 1% to about 70% of a surfactant system. In other examples, the liquid cleaning composition comprises, by weight of the composition, from about 2% to about 60% of the surfactant system. In further examples, the cleaning composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants: In some examples, the surfactant system of the cleaning composition may comprise from about 1% to about 70%, by weight of the surfactant system, of one or more anionic surfactants. In other examples, the surfactant system of the cleaning composition may comprise from about 2% to about 60%, by weight of the surfactant system, of one or more anionic surfactants. In further examples, the surfactant system of the cleaning composition may comprise from about 5% to about 30%, by weight of the surfactant system, of one or more anionic surfactants. In further examples, the surfactant system may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic surfactants: The surfactant system of the cleaning composition may comprise a nonionic surfactant. In some examples, the surfactant system comprises up to about 25%, by weight of the surfactant system, of one or more nonionic surfactants, e.g., as a co-surfactant. In some examples, the cleaning compositions comprises from about 0.1% to about 15%, by weight of the surfactant system, of one or more nonionic surfactants. In further examples, the cleaning compositions comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates ($BAE_x$), wherein x is from 1 to 30; alkylpolysaccharides; specifically alkylpolyglycosides; Polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Anionic/Nonionic Combinations: The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

Cationic Surfactants: The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the cleaning compositions can be substantially free of cationic surfactants and surfactants that become cationic below a pH of 7 or below a pH of 6.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactants: Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain examples from $C_{10}$ to $C_{14}$.

Amphoteric Surfactants: Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Branched Surfactants: Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

Adjunct Cleaning Additives: The cleaning compositions herein may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds suppressors, softeners, and perfumes.

Enzymes: The cleaning compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the cleaning composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii.*

(b) trypsin-type or chymotrypsin-type proteases, such as trypsin (e.g., of porcine or bovine origin), including the *Fusarium* protease and the chymotrypsin proteases derived from Cellumonas.

(c) metalloproteases, including those derived from *Bacillus amyloliquefaciens.*

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP with the following mutations S99D+S101 R+S103A+V1041+G159S, hereinafter referred to as BLAP), BLAP R (BLAP with S3T+V4I+V199M+V2051+L217D), BLAP X (BLAP with S3T+V4I+V2051) and BLAP F49 (BLAP with S3T+V4I+A194P+V199M+V2051+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Enzyme Stabilizing System: The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders: The cleaning compositions may optionally comprise a builder. Built cleaning compositions typically comprise at least about 1% builder, based on the total weight of the composition. Liquid cleaning compositions may comprise up to about 10% builder, and in some examples up to about 8% builder, of the total weight of the composition. Granular cleaning compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O)\cdot ySiO_2\cdot zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners: Suitable structurant/thickeners include:

i. Di-benzylidene Polyol Acetal Derivative
ii. Bacterial Cellulose
iii. Coated Bacterial Cellulose
iv. Cellulose fibers non-bacterial cellulose derived
v. Non-Polymeric Crystalline Hydroxyl-Functional Materials
vi. Polymeric Structuring Agents
vii. Di-amido-gellants
viii. Any combination of above.

Polymeric Dispersing Agents: The cleaning composition may comprise one or more polymeric dispersing agents. Examples are carboxymethylcellulose, poly(vinyl-pyrrolidone), poly (ethylene glycol), poly(vinyl alcohol), poly (vinylpyridine-N-oxide), poly(vinylimidazole), polycarboxylates such as polyacrylates, maleic/acrylic acid copolymers and lauryl methacrylate/acrylic acid co-polymers.

The cleaning composition may comprise one or more amphiphilic cleaning polymers such as the compound having the following general structure: $bis((C_2H_5O)(C_2H_4O)_n)(CH_3)—N^+—C_xH_{2x}—N^+—(CH_3)-bis((C_2H_5O)(C_2H_4O)_n)$, wherein n=from 20 to 30, and x=from 3 to 8, or sulphated or sulphonated variants thereof.

The cleaning composition may comprise amphiphilic alkoxylated grease cleaning polymers which have balanced hydrophilic and hydrophobic properties such that they remove grease particles from fabrics and surfaces. Specific examples of the amphiphilic alkoxylated grease cleaning polymers comprise a core structure and a plurality of alkoxylate groups attached to that core structure. These may comprise alkoxylated polyalkylenimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF.

The cleaning composition may comprise random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The cleaning composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The cleaning composition herein may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil Release Polymer: The cleaning compositions described herein may include from about 0.01% to about 10.0%, typically from about 0.1% to about 5%, in some aspects from about 0.2% to about 3.0%, by weight of the composition, of a soil release polymer (also known as a polymeric soil release agents or "SRA").

Suitable soil release polymers typically have hydrophilic segments to hydrophilize the surface of hydrophobic fibers, such as polyester and nylon, and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures.

Soil release agents may include a variety of charged, e.g., anionic or cationic as well as non-charged monomer units. The structure of the soil release agent may be linear, branched, or star-shaped. The soil release polymer may include a capping moiety, which is especially effective in controlling the molecular weight of the polymer or altering the physical or surface-active properties of the polymer. The structure and charge distribution of the soil release polymer may be tailored for application to different fibers or textile types and for formulation in different detergent or detergent additive products. Suitable polyester soil release polymers have a structure as defined by one of the following structures (III), (IV) or (V):

$$—[(OCHR^1—CHR^2)_a—O—OC—Ar—CO—]_d \quad (III)$$

$$—[(OCHR^3CHR^4)_b—O—OC—sAr—CO]_e \quad (IV)$$

$$—[(OCHR^5—CHR^6),OR^7]_f \quad (V)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is H, Na, Li, K, Mg+2, Ca+2, Al+3, ammonium, mono-, di-, tri-, or tetra-alkylammonium wherein the alkyl groups are C1-C18 alkyl or C2-C10 hydroxyalkyl, or any mixture thereof;

$R^1$, $R^2$, $R^3$, $R^4$, $R^5$ and $R^6$ are independently selected from H or C,-C18 n- or iso-alkyl; and $R^7$ is a linear or branched C1-C18 alkyl, or a linear or branched C2-C30 alkenyl, or a cycloalkyl group with 5 to 9 carbon atoms, or a C6-C30 aryl group, or a C6-C30 arylalkyl group.

Suitable polyester soil release polymers are terephthalate polymers having the structure (III) or (IV) above. Other suitable soil release polymers may include, for example sulphonated and unsulphonated PET/POET polymers, both end-capped and non-end-capped. Examples of suitable polyester soil release polymers are the REPEL-O-TEX® line of polymers supplied by Rhodia, including REPEL-O-TEX® SRP6 and REPEL-O-TEX® SF-2. Other suitable soil release polymers include TexCare® polymers, including TexCare® SRA-100, TexCare® SRA-300, TexCare® SRN-100, TexCare® SRN-170, TexCare® SRN-240, TexCare® SRN-300, and TexCare® SRN-325, all supplied by Clariant.

Cellulosic Polymer: The cleaning compositions described herein may include from about 0.1% to about 10%, typically from about 0.5% to about 7%, in some aspects from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix®V (sold by CP Kelko).

Additional Amines: Additional amines may be used in the cleaning compositions described herein for added removal of grease and particulates from soiled materials. The cleaning compositions described herein may comprise from about 0.1% to about 10%, in some examples, from about 0.1% to about 4%, and in other examples, from about 0.1% to about 2%, by weight of the cleaning composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

For example, alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF. The cleaning compositions described herein may comprise from about 0.1% to about 10%, and in some examples, from about 0.1% to about 8%, and in other examples, from about 0.1% to about 6%, by weight of the cleaning composition, of alkoxylated polyamines.

Alkoxylated polycarboxylates may also be used in the cleaning compositions herein to provide grease removal. Chemically, these materials comprise polyacrylates having one ethoxy side-chain per every 7-8 acrylate units. The side-chains are of the formula $—(CH_2CH_2O)_m (CH_2)_nCH_3$ wherein m is 2-3 and n is 6-12. The side-chains are ester-linked to the polyacrylate "backbone" to provide a "comb" polymer type structure. The molecular weight can vary, but may be in the range of about 2000 to about 50,000. The cleaning compositions described herein may comprise from about 0.1% to about 10%, and in some examples, from about 0.25% to about 5%, and in other examples, from about 0.3% to about 2%, by weight of the cleaning composition, of alkoxylated polycarboxylates.

Bleaching Compounds, Bleaching Agents, Bleach Activators, and Bleach Catalysts: The cleaning compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, cleaning compositions may also include a transition metal bleach catalyst.

Bleaching agents other than oxygen bleaching agents are also known in the art and can be utilized in cleaning compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the cleaning compositions described herein will typically contain from about 0.025% to about 1.25%, by weight of the composition, of such bleaches, and in some examples, of sulfonate zinc phthalocyanine.

Brighteners: Optical brighteners or other brightening or whitening agents may be incorporated at levels of from about 0.01% to about 1.2%, by weight of the composition, into the cleaning compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation), disodium 4,4'-bis {[4-anilino-6-(N-2-hydroxyethyl-N-methyl amino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents: The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents: The cleaning compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents: The cleaning compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the cleaning compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the cleaning composition.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Encapsulates: The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Method for Evaluating Cleaning Benefit of Polymers:

Cleaning benefit of polymers are evaluated using tergotometer. Some typical examples of test stains suitable for this test are:

- ASTM Dust Sebum C-S-94 ex CFT (Center for testmaterials B.V.).
- Highly Discriminating Sebum C-S-132 on polycotton ex CFT (Center for testmaterials B. V.).
- Burnt Butter on Knitted cotton KC-132 (prepared using burnt butter ex Warwick Equest).
- Dyed Bacon on Knitted Cotton KC-011 (prepared using dyed bacon ex Warwick Equest).
- Pigment/sebum on polycotton WFK 20 D ex WFK Testgewebe GmbH.

The fabrics were analyzed using commercially available DigiEye software for L, a, b values.

Inventive polymer stock solution in de-ionised water is prepared to deliver the desired dosage via 5 ml aliquot. To make 1L of test solution, 5 ml aliquot of polymer stock solution, and desired amount of base detergent are fully dissolved by mixing with water (at defined hardness) in tergotometer pot. The wash temperature is 20° C.

The fabrics to be washed in each tergotometer pot include 2 pieces of each test stain (2 internal replicates), approximately 3 g of WFK SBL2004 soil sheets (supplied by WFK Testgewebe GmbH), and additional knitted cotton ballast to make the total fabric weight up to 60 g.

Once all the fabrics are added into tergotometer pot containing wash solution, the wash solution is agitated for 12 minutes. The wash solutions are then drained, and the fabrics are subject to 5 minute rinse steps twice before being drained and spun dry. The washed stains are dried in an airflow cabinet, then analyzed using commercially available DigiEye software for L, a, b values This procedure was repeated further three times to give a total of 4 external replicates.

Stain Removal Index (SRI) are calculated from the L, a, b values using the formula shown below. The higher the SRI, the better the stain removal.

$$SRI=100*((\Delta E_b-\Delta E_a)/\Delta E_b)$$

$$\Delta E_b=\sqrt{((L_c-L_b)^2+(a_c-a_b)^2+(b_c-b_b)^2)}$$

$$\Delta E_a=\sqrt{((L_c-L_a)^2+(a_c-a_a)^2+(b_c-b_a)^2)}$$

Subscript 'b' denotes data for the stain before washing
Subscript 'a' denotes data for the stain after washing
Subscript 'c' denotes data for the unstained fabric

EXAMPLES

Example 1: Inventive and Comparative Example Based on Linear Oligoamine Core Polymers Based on Tetraethylenepentaamine (TEPA):

| Core structure | Inventive 1 TEPA | Comparative 1 TEPA |
|---|---|---|
| x | 0 | 10 |
| y | 3 | 0 |
| z | 0 | 0 |
| y + z | 3 | 0 |
| (y + z)/x | 100:0 | 0:100 |

Note:
average number of EO (x), average number of PO (y), and average number of BO (z) per active H in —OH, —NH— and/or —$NH_2$ moieties of the polymer core structure Polymers Based on Hexamethylenediamine (HMDA):

| | Inventive | | | Comparative | |
|---|---|---|---|---|---|
| Core structure | 2 HMDA | 3 HMDA | 4 HMDA | 2 HMDA | 3 HMDA |
| x | 0 | 0 | 0 | 0 | 0 |
| y | 3 | 3 | 8 | 0 | 1 |
| z | 0 | 1 | 0 | 1 | 0 |
| y + z | 3 | 4 | 8 | 1 | 1 |
| (y + z)/x | 100:0 | 100:0 | 100:0 | 100:0 | 100:0 |

Note:
average number of EO (x), average number of PO (y), and average number of BO (z) per active H in —OH, —NH— and/or —$NH_2$ moieties of the polymer core structure Polymer Based on Diethylenetriamine (DETA):

| Core structure | Inventive 5 DETA | Comparative 4 DETA |
|---|---|---|
| x | 0 | 0 |
| y | 3 | 1 |
| z | 0 | 0 |
| y + z | 3 | 1 |
| (y + z)/x | 100:0 | 100:0 |

Note:
average number of EO (x), average number of PO (y), and average number of BO (z) per active H in —OH, —NH— and/or —$NH_2$ moieties of the polymer core structure Polymer Based on 1,3-propylenediamine (1,3-PDA):

| | Inventive | | Comparative |
|---|---|---|---|
| Core structure | 6 1,3-PDA | 7 1,3-PDA | 5 1,3-PDA |
| x | 0 | 0 | 0 |
| y | 2 | 8 | 0 |
| z | 2 | 0 | 1 |
| y + z | 4 | 8 | 1 |
| (y + z)/x | 100:0 | 100:0 | 100:0 |

Note:
average number of EO (x), average number of PO (y), and average number of BO (z) per active H in —OH, —NH— and/or —$NH_2$ moieties of the polymer core structure

Example 2: Inventive and Comparative Example Based on Sugar Alcohol Comprising at Least 4 Hydroxy Moieties

| | Inventive | Comparative | | |
|---|---|---|---|---|
| Core structure | 8 Sorbitol | 6 Sorbitol | 7 Sorbitol | 8 Sorbitol |
| x | 0 | 3 | 4 | 0 |
| y | 8 | 1 | 0 | 4 |
| z | 0 | 0 | 0 | 0 |
| (y + z)/x | 100:0 | 25:75 | 0:100 | 100:0 |

Note:
average number of EO (x), average number of PO (y), and average number of BO (z) per active H in —OH, —NH— and/or —$NH_2$ moieties of the polymer core structure

Example 3: Inventive and Comparative Example Based Cyclic Amine Core

| | Inventive | |
|---|---|---|
| Core structure | 9 MCDA | 10 MCDA |
| x | 0 | 0 |
| y | 4 | 8 |
| z | 0 | 0 |

Note:
average number of EO (x), average number of PO (y), and average number of BO (z) per active H in —OH, —NH— and/or —$NH_2$ moieties of the polymer core structure

Example 4: Synthesis of Selected Inventive and Comparative Polymers

Inventive Polymer 1: $TEPA/(PO/NH)_3$ a. Tetraethylene Pentaamine (TEPA), Propoxylated with 7 Mole Propylene Oxide A 2 l autoclave is charged with 344.0 g tetraethylene pentaamine. The reactor is purged three times with nitrogen and heated to 110° C. 738.8 g propylene oxide is added within 12 hours. To complete the reaction, the reaction mixture is allowed to post-react for 10 hours. Water and volatile compounds are removed in vacuo (20 mbar) at 90° C. A highly viscous yellow oil (1080.0 g) is obtained. (This is $TEPA/(PO/NH)_1$, with 1 PO per active H).

b. Tetraethylene Pentamine, Propoxylated with 21 Mole Propylene Oxide

In a 2 l autoclave 665.0 g tetraethylene pentaamine, propoxylated with 7 mole propylene oxide (above) and 3.1 g potassium tert. butoxide are placed and the mixture is heated to 140° C. The vessel is purged three times with nitrogen. 907.4 g propylene oxide is added in portions within 12 h. To complete the reaction, the mixture is allowed to post-react for additional 10 h at 140° C. The reaction mixture is stripped with nitrogen and volatile compounds are removed in vacuo at 80° C. 1570 g of a light brown viscous oil is obtained. (This is TEPA/$(PO/NH)_3$, with 3 PO per active H).

Comparative Polymer 1: TEPA/$(EO/NH)_{10}$ a. Tetraethylene pentaamine (TEPA), ethoxylated with 7 mole ethylene oxide A 2 l autoclave is charged with 450.0 g tetraethylene pentaamine and 22.5 g water. The reactor is purged three times with nitrogen and heated to 110° C. 524.2 g ethylene oxide is added within 8 hours. To complete the reaction, the reaction mixture is allowed to post-react for 10 hours. Water and volatile compounds were removed in vacuo (20 mbar) at 90° C. A highly viscous yellow oil (973.0 g) is obtained. (This is TEPA/$(EO/NH)_1$, with 1 EO per active H).

b. Tetraethylene Pentamine, Ethoxylated with 70 Mole Ethylene Oxide

In a 2 l autoclave 199.1 g tetraethylene pentaamine ethoxylated with 7 mole ethylene oxide (above) and 2.6 g potassium tert. butoxide are placed and the mixture is heated to 140° C. The vessel is purged three times with nitrogen. 1110.0 g ethylene oxide is added in portions within 15 h. To complete the reaction, the mixture was allowed to post-react for additional 5 h at 140° C. The reaction mixture is stripped with nitrogen and volatile compounds are removed in vacuo at 80° C. 1310.0 g of a light brown viscous oil is obtained. (This is TEPA/$(EO/NH)_{10}$, with 10 EO per active H).

Inventive Polymer 3: HMDA/$(BO/NH)_1(PO/NH)_3$ a. 1,6-hexamethylene diamine (HMDA), butoxylated with 4 mole butylene oxide A 2 l autoclave is charged with 473.0 g 1,6-hexamethylene diamine and 23.7 g water. The reactor is purged three times with nitrogen and heated to 120° C. 1174.1 g butylene oxide is added within 20 hours. To complete the reaction, the reaction mixture is allowed to post-react for 25 hours. Water and volatile compounds are removed in vacuo (20 mbar) at 90° C. A highly viscous light yellow oil (1640.0 g) is obtained. (This is HMDA/$(BO/NH)_1$, with 1 BO per active H).

b. 1,6-hexamethylene diamine, Butoxylated with 4 Mole Butylene Oxide and Propoxylated with 12 Mole Propylene Oxide In a 2 l autoclave 199.1 g 1,6-hexamethylene diamine, butoxylated with 4 mole butylene oxide (above) and 1.1 g potassium tert. butoxide are placed and the mixture is heated to 140° C. The vessel is purged three times with nitrogen. 351.4 g propylene oxide is added in portions within 6 h. To complete the reaction, the mixture was allowed to post-react for additional 10 h at 140° C. The reaction mixture is stripped with nitrogen and volatile compounds are removed in vacuo at 80° C. 555.0 g of a yellow viscous oil is obtained. (This is HMDA/$(BO/NH)_1(PO/NH)_3$, with 1 BO and 3 PO per active H).

Comparative Polymer 3: HMDA/$(PO/NH)_1$ 1,6-hexamethylene diamine (HMDA), propoxylated with 4 mole propylene oxide A 2 l autoclave is charged with 348.6 g 1,6-hexamethylene diamine and 17.4 g water. The reactor is purged three times with nitrogen and heated to 110° C. 696.9 g propylene oxide is added within 12 hours. To complete the reaction, the reaction mixture is allowed to post-react for 10 hours. Water and volatile compounds are removed in vacuo (20 mbar) at 90° C. A highly viscous light yellow oil (1040.0 g) is obtained. (This is HMDA/(PO/NH) $_1$, with 1 PO per active H)

Inventive Polymer 5: Diethylenetriamine/$(PO/NH)_3$

Diethylenetriamine, Propoxylated with 15 Mole Propylene Oxide

In a 2 l autoclave 250.0 g diethylene triamine, propoxylated with 5 mole propylene oxide and 2.5 g potassium hydroxide (50% aqueous solution) are placed and the mixture is heated to 120° C. Vacuum is applied (<10 mbar) and the mixture is dewatered for 2 hours. The vessel is purged with nitrogen up to 1 bar and heated to 130° C. 368.8 g propylene oxide is added in portions within 6 h at 130° C. To complete the reaction, the mixture is allowed to post-react for additional 6 h at 130° C. The reaction mixture is stripped with nitrogen and volatile compounds are removed in vacuo at 120° C. 616.0 g of a yellow viscous oil is obtained (amine value: 167.2 mgKOH/g). (This is Diethylenetriamine/$(PO/NH)_3$, with 3 PO per active H)

Comparative Polymer 4: Diethylenetriamine/$(PO/NH)_1$

Diethylenetriamine, Propoxylated with 5 Mole Propylene Oxide

A 2 l autoclave is charged with 206.3 g diethylene triamine. The reactor is purged three times with nitrogen and heated to 100° C. 580.8 g propylene oxide is added within 6 hours. To complete the reaction, the reaction mixture is allowed to post-react for 16 hours. Volatile compounds are removed in vacuo (20 mbar) at 90° C. A highly viscous light yellow oil (759.0 g) is obtained. 1H-NMR in CDCl3 indicates complete conversion to diethylene triamine, propoxylated with 5 mole propylene oxide. (This is Diethylenetriamine/$(PO/NH)_1$, with 1 PO per active H).

Inventive Polymer 6: Propandiamine/$(BO/NH)_2(PO/NH)_2$ 1,3-propandiamine, Butoxylated with 8 Mole Butylene Oxide and Propoxylated with 8 Mole Propylene Oxide In a 2 l autoclave 210.6 g 1,3-propandiamine, butoxylated with 4 mole butylene oxide and 1.3 g potassium tert. butoxide are placed and the mixture is heated to 140° C. The vessel is purged three times with nitrogen. 179.9 g butylene oxide is added in portions within 2 hours. After addition of complete amount of butylene oxide, the mixture is stirred for 2 hours at 140° C., followed by the addition of 278.8 g propylene oxide in portions within 4 h. To complete the reaction, the mixture is allowed to post-react for additional 10 h at 140° C. The reaction mixture is stripped with nitrogen and volatile compounds are removed in vacuo at 80° C. 645.0 g of a light brown viscous oil is obtained. 1H-NMR in CDCl3 indicates complete conversion to 1,3-propandiamine, butoxylated with 8 mole butylene oxide and propoxylated with 8 mole propylene oxide. (This is Propandiamine/$(BO/NH)_2(PO/NH)_2$, with 2 BO and 2 PO per active H).

Comparative Polymer 5: Propandiamine/$(BO/NH)_1$ 1,3-propandiamine, Butoxylated with 4 Mole Butylene Oxide A 2 l autoclave is charged with 296.5 g 1,3-propandiamine and 14.8 g water. The reactor is purged three times with nitrogen and heated to 130° C. 1153.8 g butylene oxide is added within 25 hours. To complete the reaction, the reaction mixture is allowed to post-react for 40 hours. Volatile compounds are removed in vacuo (20 mbar) at 90° C. A highly viscous brown oil (1410.0 g) is obtained. 1H-NMR in CDCl3 indicates complete conversion to 1,3-propandiamine, butoxylated with 4 mole butylene oxide. (This is Propandiamine/$(BO/NH)_1$, with 1 BO per active H).

Inventive Polymer 8: Sorbitol/$(PO/OH)_8$

Sorbitol, Propoxylated with 48 Mole Propylene Oxide a. Sorbitol, Propoxylated with 18 Mole Propylene Oxide In a 2 l autoclave 248.9 g sorbitol and 6.6 g potassium hydroxide (50% aqueous solution) are placed and the mixture is heated to 125° C. Vacuum is applied (<10 mbar) and the mixture is dewatered for 2 hours. The vessel is purged with nitrogen up to 1 bar and the mixture is heated to 140° C. 1400.0 g propylene oxide is added in portions within 40 h. To complete the reaction, the mixture is allowed to post-react for additional 10 h at 140° C. The reaction mixture is stripped with nitrogen and volatile compounds are removed in vacuo at 80° C. The catalyst is removed by adding 49.4 g magnesium silicate (Ambosol®). After filtration 1635.0 g of a light brown oil is obtained (hydroxy value: 262.0 mgKOH/g). (This is Sorbitol/$(PO/OH)_3$, with 3 PO per active H).

b. Sorbitol, Propoxylated with 48 Mole Propylene Oxide

In a 2 l autoclave 200.0 g sorbitol, propoxylated with 18 mole propylene oxide (above) and 1.0 g potassium tert. butoxide are placed and the mixture is heated to 140° C. The vessel is purged three times with nitrogen. 284.0 g propylene oxide is added in portions within 3 h. To complete the reaction, the mixture is allowed to post-react for additional 6 h at 140° C. The reaction mixture is stripped with nitrogen and volatile compounds are removed in vacuo at 80° C. After filtration 453.0 g of a light brown oil is obtained (hydroxy value: 125.6 mgKOH/g). (This is Sorbitol/(PO/$OH)_8$, with 8 PO per active H).

Comparative Polymer 7: Sorbitol/$(EO/OH)_4$

Sorbitol, Ethoxylated with 24 Mole Ethylene Oxide

In a 2 l autoclave 148.7 g sorbitol and 4.0 g potassium hydroxide (50% aqueous solution) are placed and the mixture is heated to 125° C. Vacuum is applied (<10 mbar) and the mixture is dewatered for 2 hours. The vessel is purged with nitrogen up to 1 bar and the mixture is heated to 140° C. 845.8 g ethylene oxide is added in portions within 26 h. To complete the reaction, the mixture is allowed to post-react for additional 10 h at 140° C. The reaction mixture is stripped with nitrogen and volatile compounds are removed in vacuo at 80° C. 985.0 g of a light brown oil is obtained (hydroxy value: 254.1.0 mgKOH/g). (This is Sorbitol/(EO/$OH)_4$, with 4 EO per active H).

Inventive Polymer 9: MCDA/$(PO/OH)_4$

Methyl-cyclohexyl-1,3-diamine, Mixture of Isomers (MCDA), Propoxylated with 16 Mole Propylene Oxide In a 2 l autoclave 288.4 g methyl-cyclohexyl-1,3-diamine, mixture of isomers, propoxylated with 4 mole propylene oxide and 1.7 g potassium tert. butoxide are placed and the mixture is heated to 140° C. The vessel is purged three times with nitrogen. 557.6 g propylene oxide is added in portions within 10 h. To complete the reaction, the mixture was allowed to post-react for additional 10 h at 140° C. The reaction mixture is stripped with nitrogen and volatile compounds are removed in vacuo at 80° C. 845.0 g of a light brown oil is obtained (hydroxy value: 125.6 mgKOH/g). (This is MCDA/$(PO/OH)_4$, with 4 PO per active H).

Inventive Polymer 10: MCDA/$(PO/OH)_8$

Methyl-cyclohexyl-1,3-diamine, Mixture of Isomers (MCDA), Propoxylated with 32 Mole Propylene Oxide a. methyl-cyclohexyl-1,3-diamine, Mixture of Isomers, Propoxylated with 4 Mole Propylene Oxide A 2 l autoclave is charged with 410.2 g methyl-cyclohexyl-1,3-diamine, mixture of isomers and 20.5 g water. The reactor is purged three times with nitrogen and heated to 110° C. 743.4 g propylene oxide is added within 11 hours. To complete the reaction, the reaction mixture is allowed to post-react for 20 hours. Water and volatile compounds are removed in vacuo (20 mbar) at 90° C. A highly viscous light yellow oil (1150.0 g) is obtained. (This is MCDA/$(PO/OH)_1$, with 1 PO per active H).

b. methyl-cyclohexyl-1,3-diamine, Mixture of Isomers, Propoxylated with 32 Mole Propylene Oxide In a 2 l autoclave 162.2 g methyl-cyclohexyl-1,3-diamine, mixture of isomers, propoxylated with 4 mole propylene oxide (above) and 1.8 g potassium tert. butoxide are placed and the mixture is heated to 140° C. The vessel is purged three times with nitrogen. 731.8 g propylene oxide is added in portions within 10 h. To complete the reaction, the mixture was allowed to post-react for additional 10 h at 140° C. The reaction mixture is stripped with nitrogen and volatile compounds are removed in vacuo at 80° C. 1300.0 g of a light brown oil is obtained. (This is MCDA/$(PO/OH)_8$, with 8 PO per active H).

Example 5: Base Detergent Chassis

A liquid base detergent I-IV are prepared by traditional means know to those of ordinary skill in the art by mixing the listed ingredient.

Base detergent I, II and IV:

| Base Detergent | I [wt %] | II [wt %] | IV [wt %] |
|---|---|---|---|
| LAS | 17.6 | 8.1 | 6.5 |
| AES | 4.4 | 13.9 | 11.2 |
| Nonionic surfactant C1214$(EO)_7$ | 0.9 | 0.9 | 0.1 |
| Amine Oxide surfactant | 0.8 | 0.8 | 0.7 |
| DTPA | 0.6 | 0.6 | 0.7 |
| Monoethanolamine | 2.3 | 2.3 | 1.9 |
| Propylene glycol | 6.7 | 6.7 | 2.0 |
| Sodium cumene sulfonate | 0.6 | 0.6 | 0.1 |
| Citric Acid | 2.6 | 2.6 | 1.1 |
| Fatty Acid | 1.1 | 1.1 | 0.9 |
| Ethanol | 2.5 | 2.5 | 1.4 |
| Brightener | 0.2 | 0.2 | 0.2 |
| Enzyme system [1] | 0.072 | 0.072 | 0.072 |
| Preservative | 0.2 | 0.2 | 1.0 |
| Structurant | 0.1 | 0.1 | 0.0 |
| Water | balance | balance | balance |

[1] including protease, mannanase, amylase

Base detergent III

| Detergent composition | III Amount [wt %] |
|---|---|
| Dodecylbenzenesulfonate, sodium salt | 6.9 |
| Propylene glycol | 6.0 |
| Potassium hydroxide | 0.05 |
| Sodium laureth sulfate + 2 EO | 7.9 |
| C13-C15 Oxo Alcohol + 7 EO | 1.0 |
| water | to 100 |

Example 6: Cleaning Benefit Inventive Polymer 1 and Comparative Polymer 1

The cleaning benefit of Inventive polymer 1 and comparative polymer 1 in liquid base detergent I were evaluated according to test procedure. Inventive polymer 1 much better cleaning on grease and sebum stains versus Comparative polymer 1.

| | SRI versus Reference | |
|---|---|---|
| Polymer | Inventive polymer 1 (40 ppm) | Comparative polymer 1 (40 ppm) |
| ASTM Dust Sebum | 4.6 | 1.6 |
| Burnt Butter | 7.9 s | 1.7 |
| Dyed Bacon | 9.1 s | 0.5 |

Reference: Liquid base detergent I (1600 ppm)
Polymer level: 40 ppm

The cleaning benefit of Inventive polymer 1 and comparative polymer 1 in liquid base detergent II were evaluated according to test procedure. Inventive polymer 1 much better cleaning on grease and sebum stains versus Comparative polymer 1.

| | SRI versus Reference | |
|---|---|---|
| Polymer | Inventive polymer 1 (40 ppm) | Comparative polymer 1 (40 ppm) |
| ASTM Dust Sebum | 3.3 | 0.6 |
| Burnt Butter | 4.3 s | 0.3 |
| Dyed Bacon | 6.3 | −0.2 |

Reference: Liquid base detergent II (1600 ppm)
Polymer level: 40 ppm

Example 7: Cleaning Benefit Inventive Polymer 2, 3, 4 and Comparative Polymer 2, 3

The cleaning benefit of Inventive polymer 2, 3, 4 and comparative polymer 2, 3 in liquid base detergent III were evaluated according to test procedure. Inventive polymers show much better cleaning on grease and sebum stains versus Comparative polymers.

| | SRI versus Reference | | | | |
|---|---|---|---|---|---|
| | Inventive polymer | | | Comparative polymer | |
| Polymer | 2 | 3 | 4 | 2 | 3 |
| ASTM Dust Sebum | 9.4 | 14 | 13.3 | 0.7 | 4.5 |
| WFK 20 D | 6.8 | 10.2 | 12.4 | 3.6 | 4.9 |

Reference: Liquid base detergent III (2000 ppm);
Polymer level: 25 ppm
pH of the washing test solutions is adjusted to 8.2.

Example 8: Cleaning Benefit Inventive Polymer 5 and Comparative Polymer 4

The cleaning benefit of Inventive polymer 5 and comparative polymer 4 in liquid base detergent I were evaluated according to test procedure. Inventive polymer 5 show much better cleaning on grease and sebum stains versus Comparative polymer 4.

| | SRI versus Reference | |
|---|---|---|
| Polymer | Inventive polymer 5 | Comparative polymer 4 |
| ASTM Dust Sebum | 2.7 | 1.3 |
| WFK 20 D | 3.9 | −0.2 |

Reference: Liquid base detergent I (1584 ppm)
Polymer level: 48 ppm

Example 8: Cleaning Benefit Inventive Polymer 6, 7 and Comparative Polymer 5

The cleaning benefit of Inventive polymer 6, 7 and comparative polymer 5 in liquid base detergent I were evaluated according to test procedure. Inventive polymer 6 and 7 show much better cleaning on grease and sebum stains versus Comparative polymer 5.

| | SRI versus Reference | | |
|---|---|---|---|
| | Inventive polymer | | Comparative polymer |
| Polymer | 6 | 7 | 5 |
| ASTM Dust Sebum | 3.7 | 6.1 | 2.5 |
| WFK 20 D | 11 | 11.4 | 5.5 |

Reference: Liquid base detergent III (2000 ppm)
Polymer level: 48 ppm

Example 9: Cleaning Benefit Inventive Polymer 8 and Comparative Polymer 6, 7, 8

The cleaning benefit of Inventive polymer 8 and comparative polymer 6, 7, 8 in liquid base detergent I were evaluated according to test procedure. Inventive polymer 8 show much better cleaning on grease and sebum stains versus Comparative polymer 6, 7, 8.

| | SRI versus Reference | | | |
|---|---|---|---|---|
| | Inventive polymer | Comparative polymer | | |
| Polymer | 8 | 6 | 7 | 8 |
| ASTM Dust Sebum | +1.5 | +0.2 | −0.2 | +0.2 |
| Burnt butter | +4.5 s | +1.7 | +1.4 | +1.1 |

Reference: Liquid base detergent I (1600 ppm)
Polymer level: 40 ppm

Example 10: Cleaning Benefit Inventive Polymer 9, 10

The cleaning benefit of Inventive polymer 9 and 10 in liquid base detergent IV were evaluated according to test procedure. Inventive polymer 9 and 10 show significant cleaning on sebum stains.

| | SRI versus Reference Inventive polymer | |
|---|---|---|
| Polymer | 9 | 10 |
| ASTM Dust Sebum | +4.7 s | +5.1 s |

Reference: Liquid base detergent I (750 ppm)
Polymer level: 39 ppm

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning composition comprising:

(a) linear alkyl benzene sulphonate surfactant;

(b) alkyl ethoxylated sulphate surfactant;

(c) alkoxylated polymer comprising a core structure selected from:

(i) linear oligoamine represented by structure below

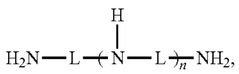

wherein each L is independently —($C_mH_{2m}$)—, wherein the index m is an integer from about 2 to about 6; and wherein the index n is an integer of from about 0 to about 10; and (ii) cyclic amine represented by structure below:

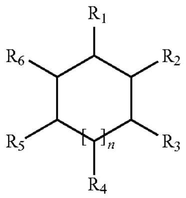

wherein $R_1$-$R_6$ are independently selected from H, —$NH_2$, —($C_1$-$C_4$)$NH_2$, linear or branched alkyl or alkenyl having from about 1 to about 10 carbon atoms, wherein at least two of $R_1$-$R_6$ are selected from —$NH_2$ and —($C_1$-$C_4$)$NH_2$ or combination, and wherein the index n is an integer of from about 1 to about 3;

wherein at least one of the active H in —NH— and/or —$NH_2$ moieties of the polymer core is modified with an alkylene oxide moiety selected from ethylene oxide (EO), propylene oxide (PO), butylene oxide (BO) and mixtures thereof, wherein EO/PO/BO alkylene oxide moiety substituents are arranged randomly or in block configuration, and wherein the average number of EO (x), average number of PO (y), and average number of BO (z) per active H in —NH— and/or —$NH_2$ moieties of the polymer core structure are determined by the following:

(a) when the polymer core structure is linear oligoamine according to formula (i),then y+z is more than about 2, and the ratio of (y+z)/x is from about 70:30 to about 100:0; and (b) when the polymer core structure is a cyclic amine according to formula (iii), then y is from about 4 to about 50, and x and z are from about 0 to about 50.

2. A cleaning composition according to claim 1, wherein the composition comprises a non-ionic surfactant.

3. A cleaning composition according to claim 2, wherein the non-ionic surfactant is an alkyl ethoxylated alcohol having an average degree of ethoxylation of from about 1 to about 10.

4. A cleaning composition according to claim 1, wherein the alkyl ethoxylated sulphate surfactant has an average degree of ethoxylation of from about 0.1 to about 5.

5. A composition according to claim 1, wherein the weight ratio of linear alkyl benzene sulphonate surfactant to alkyl ethoxylated sulphate surfactant is greater than about 2.0:1.

* * * * *